2,854,332
Patented Sept. 30, 1958

2,854,332

COPPER BASE BRAZING ALLOYS CONTAINING BORON AND IRON

Nikolajs Bredzs, Chicago, and William Rostoker, Oak Lawn, Ill., assignors to Armour Research Foundation of Illinois Institute of Technology, Chicago, Ill., a corporation of Illinois No Drawing. Application October 11, 1956
Serial No. 615,228

1 Claim. (Cl. 75—153)

This invention relates to brazing alloys, particularly a unique copper-boron-iron alloy which illustrates superior brazing properties, and to he method of producing this desirable new alloy. We have found that the alloy of the instant invention is admirably suited for the brazing of plain carbon and alloy steels.

An object of the instant invention is to provide a copper-boron-iron alloy having superior brazing properties.

A further object of the instant invention is to present a convenient and economical method of producing the instant alloy, more particularly by extracting boron from a molten iron-boron alloy into molten copper.

Still another object of the instant invention is to provide a copper base brazing material which produces joints of very high strength.

Other objects, features, and advantages of the present invention will become apparent to those skilled in the art from the following detailed disclosure thereof.

Copper-boron alloys per se are a recent development in the metallurgical art and to knowledge of the instant inventors copper-boron-iron alloys have never been produced or described. United States Patent 2,195,433, applied for in 1943 by H. Silliman discloses a method of producing a copper-boron alloy. In this particular method, copper is melted with small amounts of alkali or alkaline earth metals, or aluminum or silicon or especially with magnesium, under a layer of calcinated borax. At the high temperature utilized the reducing agents react with borax to produce elementary boron which is gradually dissolved by the molten copper. However, because of the complexities of the Silliman procedure and the expense involved, the method has not been used. In 1954 the German metallurgists, Feischl and Lihl, showed that copper-boron alloys may be prepared directly by melting pressed mixtures of copper in boron powders under high temperature conditions. Dr. F. Lihl and Dipl. Ing. B. Feishl, "Herstellung and Konstitution der Kupfer-Bor Legierungen," Metall, 1954, vol. 8, No. 1, 11-20. After this latter disclosure, the production of the binary alloy became somewhat more convenient and for the first time the metallurgists were able to evaluate its properties. The most important discovery was the fact that the addition of the boron to the copper dramatically increased the hardness of the end material. Whereas copper alone shows a Vickers hardness of 56.0, an alloy of 98% copper and 2% boron shows the hardness of 103.5. Even 0.02% boron when added to copper increases the hardness almost 5 units.

In view of the hardness of the copper-boron alloys, the instant inventors began an investigation to determine the feasibility of their use as brazing compounds. However, we found in brazing plain carbon steels with Cu-B alloys containing from 1 to 2 percent boron that as soon as the alloy flows into the joint appreciable amounts of iron became dissolved in the alloy. The dissolved iron forms an intermetallic compound with the boron which upon solidification of the filler metal precipitates in the form of a continuous layer on the steel-filler-metal interface. We found the continuous layer quite disadvantageous as it results in an embrittlement of the joint. It was our opinion that the presaturation of the binary alloy with iron would eliminate this detrimental interface layer and our experimental results have confirmed this hypothesis. The instant alloy not only possesses the desirable hardness qualities of the copper-boron alone, but the inclusion of iron provides a brazing material of great strength and little or no brittleness. The instant invention is directed to the ternary alloy so produced and to the method of producing the same.

We have found that the copper-boron-iron alloys prepared by presaturating the copper-boron alloys with iron are quite homogeneous in the ingot form as well as in the brazed joints. Joints brazed with alloys of the instant invention are extremely stable and of high tensile strength.

Basically, our novel alloys consist primarily of copper with small amounts of iron and boron. Contrary to our findings, Lihl and Feishl, in the above mentioned paper, consider even the slightest amount of iron in a copper boron alloy as extremely detrimental to its usefulness. According to them, iron extracts boron from the molten copper and precipitates in the form of extremely brittle iron-boron-inclusions. In accordance with this theory, it is interesting to note that the experimental copper-boron alloys presently available on the market are offered as "chemically pure and practically free from iron."

The following table indicates a few of the useful compositions that are encompassed within the scope of the instant invention:

| Percent Boron | Percent Iron | Percent Copper |
|---|---|---|
| .02 | 4.0 | Balance. |
| .15 | 3.0 | Do. |
| .25 | 2.2 | Do. |
| .29 | 2.0 | Do. |
| .50 | 1.0 | Do. |
| .84 | .60 | Do. |
| 1.09 | .41 | Do. |

In order that those familiar with this particular art may make the alloys of the instant invention, the following detailed example of its preparation is presented: 2 grams of boron powder were mixed with 10 grams of iron powder and 40 grams of iron chips. The mixture was melted in an alundum crucible placed in an induction coil. Some stirring was necessary to obtain a homogeneous melt. After solidification, small amounts of undissolved boron were observed on the top of the solidified ingot which small amounts were removed with a grinding wheel. This produces an alloy composed of 96.2% of iron and 3.8% of boron. Fifty grams of the prepared iron-boron alloy were mixed with 50 grams of copper chips, and the mixture melted in an alundum crucible placed in an induction coil. Upon solidification, two sharply separate layers could be observed on the polished cross-section of the ingot. The upper layer we found consists of an iron-rich phase and the lower layer of a copper-rich phase. Chemical analysis of the lower, copper-rich phase, showed the following composition: 0.29% boron, 2.0% iron, balance copper. The hardness measurements were from 73 to 79 (in Vicker's units). When used to braze 1% carbon steel a joint of 0.003 inch thick produced a joint strength of 96,000 lbs. per square inch, while a joint of extreme thinness had a joint strength of 140,000 lbs. per square inch. The tensile strength of the alloy per se is approximately 65,000 pounds per square inch.

For reasons evident to those skilled in this art the instant alloys must be produced in a protective atmosphere. Where the necessary equipment is available a vacuum may be utilized. An inert or slightly reducing atmosphere is another example of what is meant by protective atmosphere. A medium consisting of 10% hydrogen and 90% nitrogen has been found to give very good results. Although pure nitrogen, helium, argon, or other inert gases may be used, the use of a hydrogen-nitrogen mixture is considered the preferred embodiment of the instant process. Of course, other measures may be taken to provide this condition and this invention should not be considered as limited to the use of the above mentioned examples.

The lower, or copper-rich, phase represents the alloy of the instant invention. We have used it in the brazing of plain carbon steels; and in the brazing of stainless steel and S. A. E. 4340 steel. Joints brazed with the instant alloys average approximately 40% higher in tensile strength than joints brazed with pure copper. The tensile strength of joints brazed with the instant alloy will be determined principally by the composition of the alloy used and its thickness.

A wide range of desirable alloys may be produced by modifying the respective amounts of boron and iron in the finished product. It is comparatively simple to produce these variations by varying the relative proportions of constituents in the iron-boron master alloy. For example, by using an iron-boron alloy of fairly high boron compositions, and extracting the boron with liquid copper, the following composition in the liquid phase has been obtained: 98.5% copper, 1.09% boron, 0.41% iron.

The boron content of the instant alloy may range from 0.02% to 1.1% in order to produce the desirable end product. A greater boron content results in a brittle alloy. The iron content, on the other hand, may range from 0.40% to 4.0%. We have found that the percentages iron and boron that may be added to the instant alloys are interdependent. As the iron content is increased, the percentage of boron which can be homogeneously included will be reduced. Thus, an alloy containing 4.0% iron will have only minimal amounts of boron. Likewise, when the boron content is 1.1% the iron content will be minimal.

The alloys of the instant invention may contain small amounts of impurities, depending upon the purity of the raw metals used in the fabrication. We have found that materials such as manganese and silicon may be present in amounts up to 0.05 percent. Other materials may also be present.

It will be understood that modifications and variations may be effected without departing from the spirit and scope of the novel concepts of the present invention.

We claim as our invention:

A homogeneous copper base brazing alloy having high tensile strength consisting of from 0.40% to 4.0% iron, 0.2% to 1.10% boron, balance copper, wherein when said iron content is high, said boron content is low, and the converse is also true, said alloy being saturated with iron.

References Cited in the file of this patent
UNITED STATES PATENTS

| | | |
|---|---|---|
| 570,014 | Hall | Oct. 27, 1896 |
| 2,755,182 | Cape | July 17, 1956 |
| 2,768,893 | Bredzs | Oct. 30, 1956 |

FOREIGN PATENTS

| | | |
|---|---|---|
| 862,117 | France | Nov. 22, 1940 |
| 536,893 | Great Britain | May 30, 1941 |